United States Patent
Liao et al.

(10) Patent No.: US 9,654,327 B2
(45) Date of Patent: May 16, 2017

(54) CHANNEL ADAPTIVE ADC-BASED RECEIVER

(71) Applicant: Xilinx, Inc., San Jose, CA (US)

(72) Inventors: Yu Liao, Longmont, CO (US);
Geoffrey Zhang, San Jose, CA (US);
Hongtao Zhang, San Jose, CA (US);
Kun-Yung Chang, Los Altos Hills, CA (US); Toan Pham, San Jose, CA (US);
Zhaoyin D. Wu, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/723,171

(22) Filed: May 27, 2015

(65) Prior Publication Data

US 2016/0352557 A1 Dec. 1, 2016

(51) Int. Cl.
*H03K 5/159* (2006.01)
*H04L 27/38* (2006.01)
*H04L 25/03* (2006.01)

(52) U.S. Cl.
CPC .... *H04L 27/3809* (2013.01); *H04L 25/03057* (2013.01); *H04L 25/03885* (2013.01)

(58) Field of Classification Search
CPC ......... H04L 25/03019; H04L 25/03057; H04L 25/03885; H04L 27/01; H04L 2025/0349; H04L 25/03267; H04B 1/10
(Continued)

(56) References Cited

U.S. PATENT DOCUMENTS 5,604,741 A * 2/1997 Samueli ................ H04L 7/0334
370/402
6,505,222 B1 * 1/2003 Davis .................... H03M 13/00
375/233
(Continued)

FOREIGN PATENT DOCUMENTS

GB 2506458 4/2014

OTHER PUBLICATIONS

Coskun, Orhan et al., "Baud Rate Timing Recovery and Slicer Threshold Estimation for the Adaptive Dispersion compensation of Fiber Optical Channels," Conference Record of the 37th Asilomar Conference on Signals, Systems and Computers, Nov. 9, 2003, pp. 27-31, vol. 1, IEEE, Piscataway, New Jersey, USA.
(Continued)

*Primary Examiner* — Leila Malek
(74) *Attorney, Agent, or Firm* — W. Eric Webostad; Carleton Clauss

(57) ABSTRACT

A receiver relates generally to channel adaptation. In this receiver, a first signal processing block is coupled to a communications channel. The first signal processing block includes: an AGC block and a CTLE block for receiving a modulated signal for providing an analog signal; an ADC for converting the analog signal to digital samples; and an FFE block for equalizing the digital samples to provide equalized samples. A second signal processing block includes: a DFE block for receiving the equalized sampled for providing re-equalized samples; and a slicer coupled to the DFE block for slicing the re-equalized samples. A receiver adaptation block is coupled to the first signal processing block and the second signal processing block. The receiver adaptation block is configured for providing an AGC adaptation, a CTLE adaptation, and a slicer adaptation to the communications channel.

15 Claims, 11 Drawing Sheets

(58) Field of Classification Search
USPC .................................. 375/232, 233, 345
See application file for complete search history.

(56) References Cited

U.S. PATENT DOCUMENTS

| | | | | |
|---|---|---|---|---|
| 9,106,462 | B1* | 8/2015 | Aziz | H04L 25/03057 |
| 9,325,536 | B2* | 4/2016 | Patel | H04L 25/03019 |
| 2004/0257253 | A1* | 12/2004 | Jones | G11B 20/10203 |
| | | | | 341/143 |
| 2005/0271169 | A1 | 12/2005 | Momtaz et al. | |
| 2009/0110047 | A1* | 4/2009 | Lai | H03G 3/3078 |
| | | | | 375/232 |
| 2010/0284686 | A1* | 11/2010 | Zhong | H04L 25/03019 |
| | | | | 398/1 |
| 2013/0148712 | A1 | 6/2013 | Malipatil et al. | |
| 2015/0381393 | A1* | 12/2015 | Kotagiri | H04L 25/0307 |
| | | | | 375/233 |

OTHER PUBLICATIONS

Hong, Juhyung et al., "Novel Digital Signal Processing Unit Using New Digital Baseline Wander Corrector for Fast Ethernet," Journal of Signal Processing Systems, Nov. 2010, pp. 193-204, Kluwer Academic Publishers, Hingham, MA, USA.

\* cited by examiner $$err = \begin{cases} 1, & sat < sat\_l \\ 0, & sat\_l \le sat \le sat\_h \\ -1, & sat > sat\_h \end{cases}$$

301 — 302, 303, 304

FIG. 3A current gain = previous gain + $\mu$ * err 300, 301, 311, 312, 313

$nyq = |f_0 - f_1 + f_2 - f_3 + f_4|$ ~502

FIG. 5B

$$err = \begin{cases} 1, & nyq < f\_l \\ 0, & f\_l \leq nyq \leq f\_h \\ -1, & nyq > f\_h \end{cases}$$

$current\ kh = previous\ kh + \mu * err$ ~510

711 620 420 intermediate updated h0 = previous h0 + μ · sgn($e_k$) · $d_k$

FIG. 7A $$h0 = \begin{cases} x\_mean/2 + \Delta h & \text{if } h0 > x\_mean/2 + \Delta h \\ h0 & \text{otherwise} \\ x\_mean/2 - \Delta l & \text{if } h0 < x\_mean/2 - \Delta l \end{cases}$$

128 — 713 — 705 — 702, 703, 712 — 130, 704, 130

FIG. 7B $$te_{k-1} = e_{k-1} \cdot (y_k - y_{k-2})$$

FIG. 9A

$$y_k = \hat{d}_k + h1 \cdot \hat{d}_{k-1}$$

FIG. 9B

CHANNEL ADAPTIVE ADC-BASED RECEIVER

TECHNICAL FIELD

The following description relates to integrated circuit devices ("ICs"). More particularly, the following description relates to a channel adaptive analog-to-digital converter-based receiver for an IC.

BACKGROUND

High-speed serial communication circuits, such as for example an input side of a 40 gigabits/second ("Gbits/s") or faster serializer-deserializer ("SerDes"), conventionally use signal processing circuitry to achieve at least a target bit error rate. Along those lines, high-speed communication links or channels may have different signal loss levels. Accordingly, it would be useful to have a channel adaptive analog-to-digital converter-based ("ADC-based") receiver, such as a channel-adaptive, ADC-based SerDes receiver for example, to accommodate dynamically changing signal channel transmission conditions to achieve at least a target error rate.

SUMMARY

A receiver relates generally to channel adaptation. In such a receiver, a first signal processing block is coupled to a communications channel. The first signal processing block includes an automatic gain control ("AGC") block and a continuous time linear equalization ("CTLE") block for receiving a modulated signal for providing an analog signal. The first signal processing block further includes an analog-to-digital converter ("ADC") for converting the analog signal to digital samples. The first signal processing block yet further includes a feed-forward equalization ("FFE") block for equalizing the digital samples to provide equalized samples. A second signal processing block includes a decision feedback equalization ("DFE") block for receiving the equalized sampled for provide re-equalized samples. The second signal processing block further includes a slicer coupled to the DFE block for slicing the re-equalized samples. A receiver adaptation block is coupled to the first signal processing block and the second signal processing block. The receiver adaptation block is configured for providing an AGC adaptation, a CTLE adaptation, and a slicer adaptation to the communications channel.

A method generally relates to receiving. In such a method, equalized samples are decision feedback equalized with a decision feedback equalization ("DFE") block to provide re-equalized samples. The re-equalized samples are sliced with a slicer to provide decisions corresponding to a modulation type of a modulated signal. Automatic gain control ("AGO") adaptation feedback is generated with an AGC adaptation block for adjusting an AGC block to a communications channel. The AGC adaptation block is adjusted with the AGC adaptation feedback. Continuous time linear equalization ("CTLE") adaptation feedback is generated with a channel estimation block and a CTLE adaptation block for adjusting a CTLE block to the communications channel. The CTLE adaptation block is adjusted with the CTLE adaptation feedback. Slicer adaptation feedback is generated with a mean determination block and a slicer adaptation block for adjusting a slicer level provided to the slicer to adapt to the communications channel.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3A and 3B are equation diagrams depicting exemplary equations for configuring an AGC adaptation block of the AGC adaptation loop of FIG. 2.

FIGS. 5A through 5D are equation diagrams depicting exemplary equations for configuring a CTLE adaptation block of the CTLE adaptation loop of FIG. 4.

FIGS. 7A and 7B are equation diagrams depicting exemplary equations for configuring a slicer adaptation block of the slicer adaptation loop of FIG. 6.

FIGS. 9A and 9B are equation diagrams depicting exemplary equations for configuring an minimum mean square error ("MMSE") clock data recovery ("CDR") block of the baud rate timing recovery loop of FIG. 8.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Because channels may have noise, such as inter-symbol interference ("ISI") among other types of noise, a receiver may have to adapt to a channel in order to resolve data at or below a target bit error rate. For high data transmission frequencies, such as may be associated with serial communication, adaptation to a channel may be significant to resolve data at or below a target bit error rate.

As described below, a channel adaptive receiver uses multiple feedback loops or paths for adjusting such receiver to a communications channel. These adaptations may include one or more of automatic gain control feedback adjustment, continuous time linear equalization feedback adjustment, slicer filter coefficient adjustment, and/or baud rate timing recovery for ADC sampling phase adjustment. Additionally, an optional diversity combining may be used to further clean-up a digital signal before slicing.

With the above general understanding borne in mind, various configurations for a channel adaptive receiver, as well as modules thereof, are generally described below.

Figure 1:
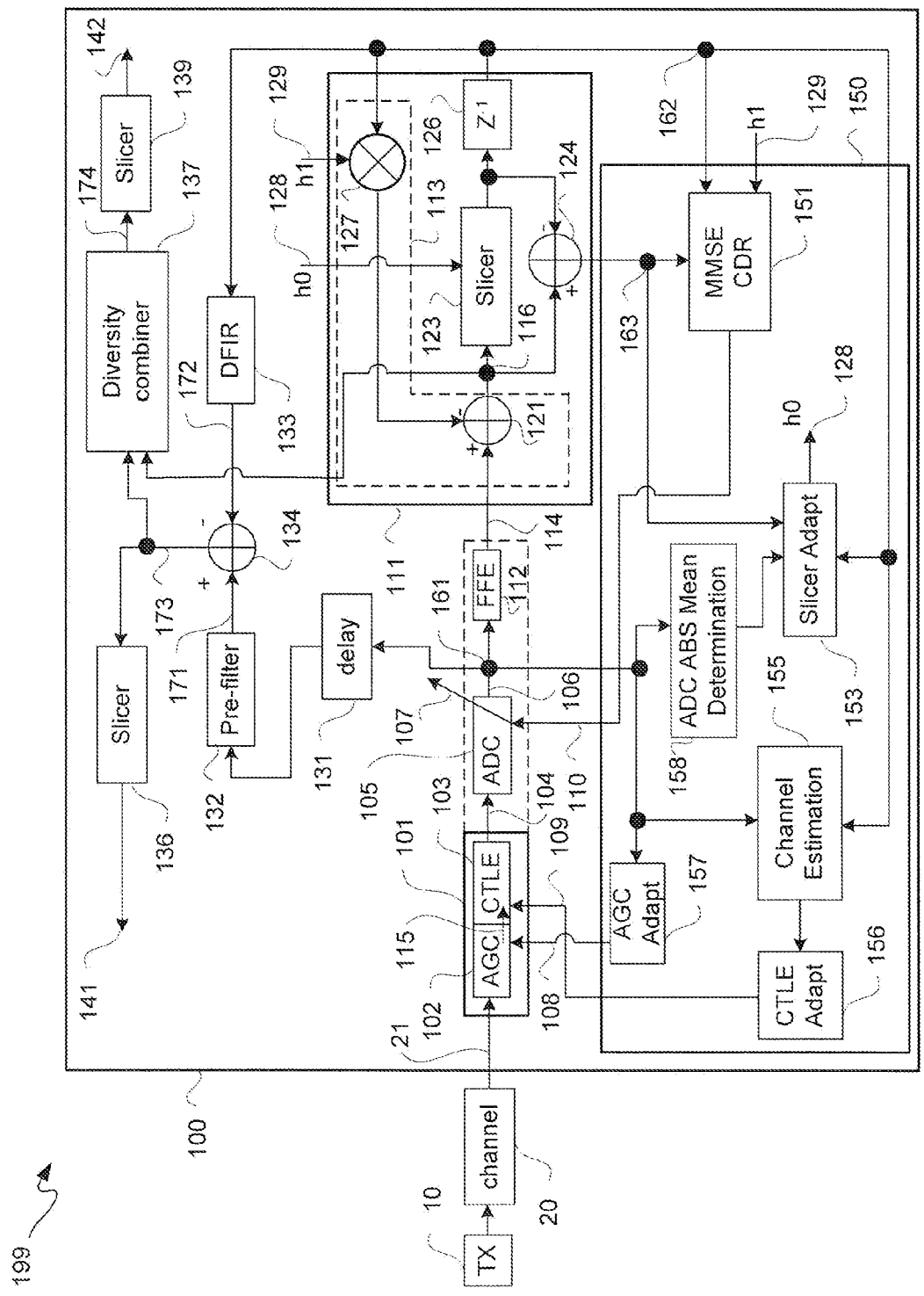
FIG. 1 is a block diagram depicting an exemplary communication system.

FIG. 1 is a block diagram depicting an exemplary communication system 199. Communication system 199 may include a transmitter 10 and a receiver 100 coupled to one another for communication via a communications channel 20. Receiver 100 may be a channel adaptive receiver, as described below in additional detail. Receiver 100 may be in an FPGA, ASIC, or any other IC used for wired communication of data at a high serial data rate, generally above 40 gigabits/second ("Gbits/s"). Receiver 100 may be used as part of a SerDes, where serial data output by receiver 100 may be subsequently converted to parallel data. However, for purposes of clarity, the following description is for recovering of a serial data stream output by a channel adaptive receiver 100, and so known details regarding conversion of such serial data to parallel data are not described for purposes of clarity and not limitation.

Transmitter 10 and communications channel 20 may be conventional, and thus are not described in unnecessary detail herein for purposes of clarity and not limitation. Along those lines, communications channel 20 may be a conventional backplane channel.

Receiver 100 may include a first signal processing block 101. Signal processing block 101 may include an automatic gain control ("AGC") block 102 and a continuous time linear equalization ("CTLE") block 103. First signal processing block 101 may be coupled to communications channel 20 for receiving therefrom a modulated signal 21 for providing an analog signal 104. Even though the following description is for pulse amplitude modulation ("PAM"), and particularly PAM4, for purposes of clarity by way of example and not limitation, the following description is generally applicable to any form of modulated signal 21, as such signals may be equalized and timing recovery may be obtained from such signals.

AGC block 102 may amplify modulated signal 21 to provide amplified signal 115. CTLE block 103 may pre-filter or pre-equalize amplified signal 115 to provide analog signal 104.

Receiver 100 may include analog-to-digital converter ("ADC") 105 for converting analog signal 104 to digital samples 106. First signal processing block 101, in particular AGC block 102, may be used to ensure that amplitudes of analog signal 104 are neither too low nor too high for input to ADC 105 to ensure an acceptable quantization error during operation of ADC 105. Having CTLE block 103 perform pre-equalization in an analog domain may be used to reduce complexity associated with equalization in a digital domain by a feed-forward equalization ("FFE") block 112 and a second signal processing block 111. Generally, pre-equalization in an analog domain may be used to reduce digital domain equalization complexity. First signal processing block 101 may further generally include ADC 105 and FFE 112 as part of a feed forward path of receiver 100, as generally indicated with a dashed line.

Sampling phase of ADC 105 may be adjustable, as generally indicated by arrow 107. Moreover, AGC block 102 and CTLE block 103 may be adjustable responsive to AGC feedback signal 108 and CTLE feedback signal 109, respectively, as described below in additional detail. ADC 105 may convert analog signal 104 into digital samples 106 for input to a feed-forward equalization ("FFE") block 112 and to delay 131. Along those lines, AGC block 102 and CTLE block 103 are analog blocks with feedback controlled by respective digital feedback signals, namely AGC feedback signal 108 and CTLE feedback signal 109. Likewise, a significant portion of ADC 105 is analog, but this analog portion of ADC 105 is controlled by a digital feedback signal, namely sampling phase adjustment signal 110, as described below in additional detail.

Receiver 100 may include a FFE block 112. Besides postcursor ISI reduction, FFE block 112 may filter digital samples 106 to equalize out, or at least substantially reduce, precursor intersymbol interference ("ISI") to provide equalized samples 114 to a decision feedback equalization ("DFE") 113 of a second signal processing block 111. DFE block 113 may further equalize equalized samples 114 to cancel out, or at least substantially reduce, residual postcursor ISI to provide re-equalized samples 116 for input to a slicer 123 of second signal processing block 111. In this example, DFE 113 is a one-tap DFE; however, in another implementation, more than one tap may be used for DFE. With a one-tap DFE 113, postcursor ISI may be cancelled out, or at least substantially reduced, with a decision. Slicer 123 may "slice" such re-equalized samples 116 for data reconstruction.

Second signal processing block 111 of receiver 100 may include a subtractor 121, a subtractor 124, a slicer 123, a multiplier 127, and a delay 126. Generally, a DFE 113 of second signal processing block 111 may receive an h1 129 coefficient input. DFE 113 may include a multiplier 127 and a subtractor 121, as described below in additional detail. Moreover, a coefficient h1 129 input may be determined in a known manner by receiver 110 through for example receipt of a training pattern data stream from a transmitter, and accordingly description of such known convention is not described herein for purposes of clarity. However, a coefficient h0 128 input may be generated through channel adaptation as described herein.

Equalized samples 114 may be input to a plus port of subtractor 121, and an output of multiplier 127 may be provided to a minus port of subtractor 121. Re-equalized samples 116 output from subtractor 121 may be provided as an input to slicer 123, a plus port of subtractor 124, and diversity combiner 137. Diversity combiner 137 may combine digital re-equalized samples 116 output from subtractor 121 with digital samples output from subtractor 134, as described below in additional detail. Along those lines, a digital difference signal 173 and re-equalized samples 116 may be diversity combined with a diversity combiner 137 for providing a digital output, namely for providing a combined equalized signal 174.

Data output from slicer 123 may be input to delay 126 and may be input to a minus port of subtractor 124. A difference output from subtractor 124, which may be an error, may be provided as an input to a minimum mean square error ("MMSE") clock data recovery ("CDR") block 151 and to slicer adaptation block 153 both of receiver adaptation block 150.

Output from delay 126 may be provided as an input to multiplier 127. Output from delay 126 may further be provided as an input to a decision finite impulse response ("DFIR") filter 133, and as an input to MMSE CDR block 151, slicer adaptation block 153, and channel estimation block 155 of receiver adaptation block 150. Another input to multiplier 127 may be an h1 coefficient 129, and another input to slicer 123 may be an h0 coefficient 128. A value for h1 coefficient 129 may be fixed or adjusted. A value for h0 coefficient 128 may be a fed back value sourced from an output of slicer adaptation block 153. Another input to MMSE CDR block 151 may be such h1 coefficient 129. Sampling phase adjustment signal 110 output from MMSE CDR block 151 may be used to adjust sampling phase of ADC 105 as a controlled feedback adjustment.

Generally, DFIR filter 133 may be used to generate an estimated residual ISI 172 associated with pre-filtered digital samples output 171 of pre-filter 132. In some cases the pre-filter may be the same as the FFE 112 or part of the FFE 112. Output of an estimated residual ISI 172 of DFIR filter 133 may be provided to a minus port of subtractor 134, and output 171 of pre-filter 132 may be provided to a plus port of subtractor 134. Input to pre-filter 132 may be digital samples 106 after passing through delay 131. Delay 131 may be used to generally mimic delay of processing digital samples 106 through FFE 112 and second signal processing block 111, so outputs of pre-filter 132 and DFIR filter 133 are aligned to one another for cancellation, or at least substantial reduction, of a digital representation of residual ISI by subtractor 134. In contrast with one-tap DFE 113, DFIR 133 may cancel out, or at least substantially reduce, both precursor and postcursor ISI with decisions. DFIR 133 may allow for finer resolution of noise enhancement, as well as additional ISI reduction for less residual or residue ISI.

Therefore, in addition to passing through FFE 112 and second signal processing block 111, pre-filter 132 provides another path with pre-filtering for partial response equalization and noise shaping to provide a pre-filtered output 171 of digital samples 106. Output 171 of pre-filter 132 may be provided as an input to a plus port of subtractor 134 for removal, or at least reduction, of actual residual ISI thereof. Such residual ISI estimated by output 172 of DFIR filter 133 includes estimates of precursor and postcursor ISI to be subtracted out by subtractor 134.

Because pre-filter 132 and FFE 112/second signal processing block 111 may have different frequency responses, noise in such two signal paths may be different. Moreover, residual ISI in such two signal paths may be different due to differences in ISI cancellation. By feeding outputs of subtractors 121 and 134, which are aligned to one another, for input into diversity combiner 137, diversity between such two outputs may be used to enhance equalization for providing to a data slicer 139. Diversity combiner 137 may thus combine such two inputs to provide a "cleaner" signal.

Digital difference output 173 of subtractor 134 may be provided as an input to data slicer 136 and as an input to diversity combiner 137. Data output 141 of data slicer 136 may be data obtained from transmitted data received via communications channel 20 by receiver 100. Combined equalized signal 174 of diversity combiner 137 may be provided as an input to data slicer 139, and data output 142 of data slicer 139 may be data obtained from transmitted data received via communications channel 20 by receiver 100. Accordingly, either of such data output paths may be used, namely with or without diversity combination, and so a single data slicer with a multiplexer (not shown) may be used in another implementation.

Receiver 100 may include an receiver adaptation block 150 coupled to first signal processing block 101, ADC 105, second signal processing block 111, and slicer block 153 for providing an AGC adaptation, a CTLE adaptation, and slicer adaptation for adaptation to communications channel 20. Even though four types of adaptation may be included in receiver adaptation block 150, in another implementation less than all four types of such adaptation may be used, though this may negatively impact performance.

In addition to MMSE CDR block 151, slicer adaptation block 153, and channel estimation block 155, receiver adaptation block 150 may include AGC adaptation block 157 and CTLE adaptation block 156.

Architecture of receiver 100 may reduce adaptation interaction among different blocks thereof, which may increase robustness of receiver 100. Overall, receiver 100 may support high-speed data rates, such as 40 Gbits/s or more. Along those lines, receivers 100 may be used for high-speed serial links, including in more challenging SerDes channel applications than conventional analog-based receivers.

Receiver adaptation block 150 includes AGC adaptation block 157, CTLE adaptation block 156, channel estimation block 155, ADC absolute value ("ABS") mean determination block 158, slicer adaptation block 153, and MMSE CDR block 151. Digital samples 106, or saturation states thereof, output from ADC 105 may be provided as inputs to AGC adaptation block 157, channel estimation block 155, and ADC ABS mean determination block 158. Output of channel estimation block may be provided as an input to CTLE adaptation block 156. Output of CTLE adaptation block 156 may be CTLE feedback signal 109, namely a control signal. Output of AGC adaptation block 157 may be AGC feedback signal 108. Output of ADC ABS mean determination block 158, namely a running average or mean of an absolute value of digital samples 106, may be provided as an input to slicer adaptation block 153. Other inputs and outputs of other blocks of receiver adaptation block 150 were previously described, and additional details regarding receiver adaptation block 150 are described below with reference to nodes 161, 162, and 163 for purposes of clarity.

Figure 2:
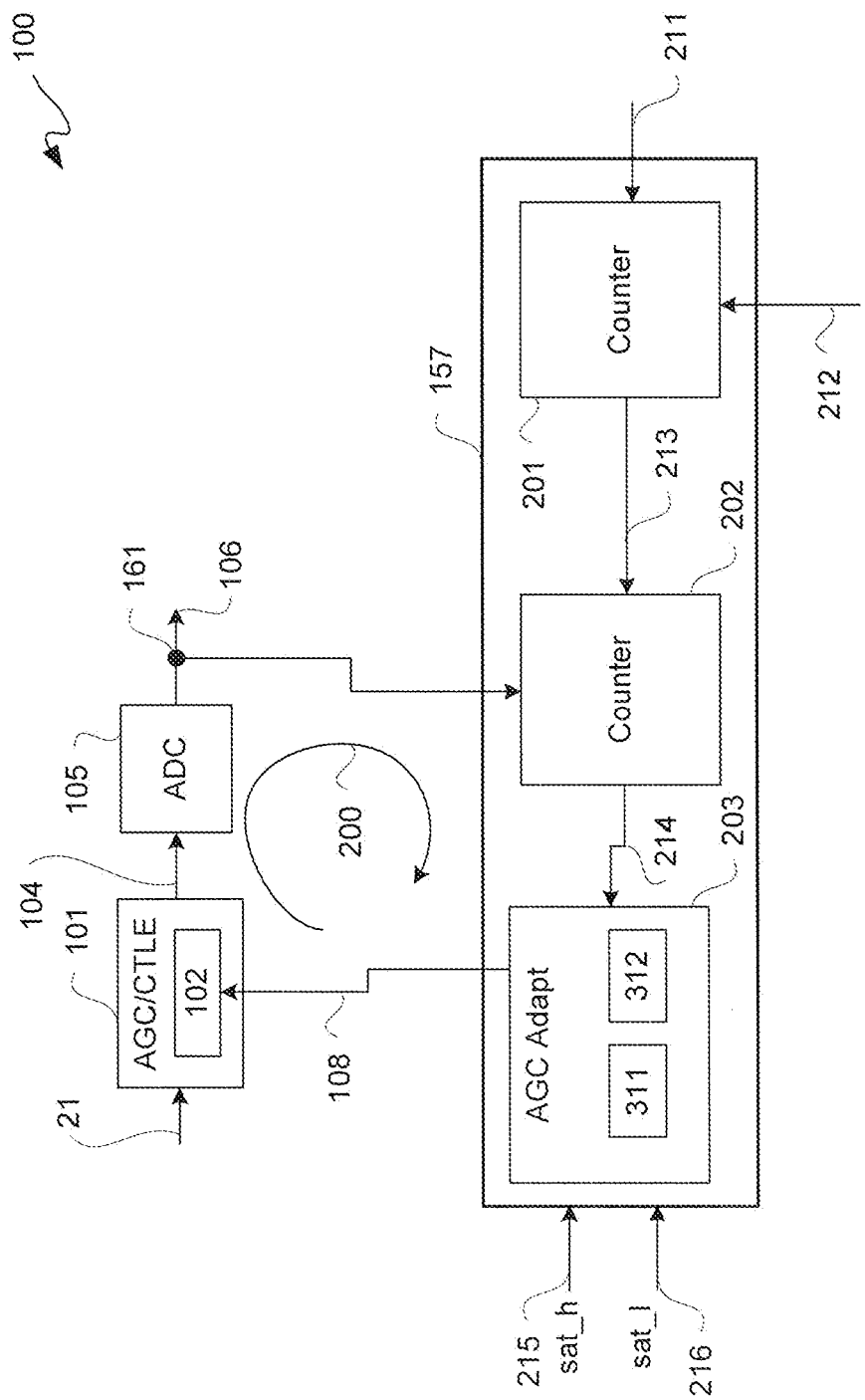
FIG. 2 is a block diagram depicting an exemplary automatic gain control ("AGC") adaptation loop for a receiver adaptation block of the channel adaptive receiver of FIG. 1.

FIG. 2 is a block diagram depicting an exemplary AGC adaptation loop 200 for receiver adaptation block 150 of receiver 100. As previously described, modulated signal 21 is processed through first signal processing block 101, including AGC block 102, for providing analog signal 104 to ADC 105. ADC 105 outputs digital samples 106 for such analog signal 104 input. First signal processing block 101 and ADC 105 are of a feedforward path portion of AGC adaptation loop 200. A feedback path portion of AGC adaptation loop 200 includes AGC adaptation block 157.

AGC adaptation block 157 includes a first counter 201, a second counter 202, and an AGC adaptation module 203, as follows. First counter 201, such as a clock pulse counter ("clock counter"), may be coupled for receiving a clock signal 211 and a window length signal 212 for providing a reset signal 213 to second counter 202. Accordingly, clock counter 201 may be programmed or set to a window length provided via window length signal 212. Clock counter 201 may thus count pulses for duration of a set window length. Along those lines, such a window length may be specified as a number of pulses for a frequency of clock signal 211. After reaching such a window length or pulse count number, clock counter 201 may assert reset signal 213 to second counter 202.

Second counter 202 may be coupled to receive reset signal 213 and digital samples 106 for feedback. Digital samples 106 may be sourced at ADC output node 161.

Second counter 202 may count saturation states of ADC 105 in digital samples 106 between assertions of reset signal 213, namely during duration of a then current window length set responsive to window length signal 212. In response to assertion of a reset signal 213 provided to second counter ("saturation counter") 202, saturation counter 202 may output a then current count value, namely a number of ADC saturation states for digital samples 106 for such a window length, via count signal 214 to AGC adaptation module 203. In other words, a number of saturation states counted ("sat") need not be a continually running output, but rather may be sent out for each total accumulated value over a single window length responsive to each assertion of reset signal 213. Window length may be programmable via window length signal 212.

AGC adaptation module 203 may be coupled for receiving a high threshold saturation ("sat_h" or "saturation high") signal 215, a low threshold saturation ("sat_l" or "saturation low") signal 216, and count signal 214 for providing a gain indication signal, namely AGC feedback signal 108, as a control feedback input to AGC block 102 of first signal processing block 101. Along those lines, saturation high signal 215 and saturation low signal 216 are respectively for setting a saturation high level and a saturation low level for AGC adaptation module 203. Such saturation high level and saturation low level may be respectively programmable via saturation high signal 215 and saturation low signal 216.

With additional reference to FIGS. 3A and 3B, AGC adaptation module 203 is further described. AGC adaptation module 203 may provide AGC feedback signal 108 to indicate a current gain value 313 to AGC block 102 in accordance with Equation 300. This AGC feedback signal 108 is a digital signal, and thus such digital feedback control may be used for analog adjustments by AGC block 102. Such a current gain value 313 may be set equal to a previous gain value 312, stored in AGC adaptation module 203, plus an error value 301 multiplied by an update gain value, μ, 311.

In this example, such an error value 301 may be either +1, 0, or −1, depending where "sat", a total saturation count value output by saturation counter 202 for a window length L, is relative to a saturation high level or threshold value and a low saturation level or threshold value provided via high saturation threshold signal 215 and low saturation threshold signal 216, respectively. There are three possible error states, namely a high error state 304, a medium error state 303, and a low error state 302, in this example. In this example, "μ" is an update gain value 311, which may be programmable for programmable control of bandwidth of AGC adaptation loop 200. AGC adaptation loop 200 may be operated independently with respect to a CTLE adaptation and a slicer adaptation, each of which is described below in additional detail.

Generally, if there are too many saturations within a window length, then signal gain in AGC block 102 is adjusted too high and is to be reduced, namely ADC resolution is set too high and a −1 may be used to step down signal gain. Along those lines, if a sat count is greater than a high saturation sat_h threshold, then high error state 304 is selected for error 301.

If there are too few saturations within a window length, then signal gain in AGC block 102 is adjusted too low and is to be increased, namely ADC resolution is not fully used and a +1 may be used to step up signal gain. Along those lines, if a sat count is less than a low saturation sat_l threshold, then low error state 302 is selected for error 301.

Lastly, if there are a medium amount of saturations within a window length, then signal gain in AGC block 102 is adjusted just right, and so a 0 or no adjustment may be used to leave signal gain as is. Along those lines, if a sat count is between a low saturation sat_l threshold and a high saturation sat_h threshold inclusive, then signal gain in AGC block 102 is correctly adjusted, namely error state 303 is selected so no change in AGC block 102 is made.

By ADC saturation, it should be understood that an ADC has an output bit width. For example, suppose an ADC has an output bit with of 6, with a sign bit to indicate plus or minus. Then a positive maximum digital sample value output from such an ADC would be +31 and a negative maximum (i.e., minimum) digital sample value output from such an ADC would be −32. These extreme values are saturation states, which may be used to indicate that ADC resolution is too high or too low, respectively.

Accordingly, AGC block 102 is used for equalization of amplitude. Whereas, in the main, CTLE block 103 is associated with equalization of frequency, though there may be some amplitude equalization involved.

Figure 4:
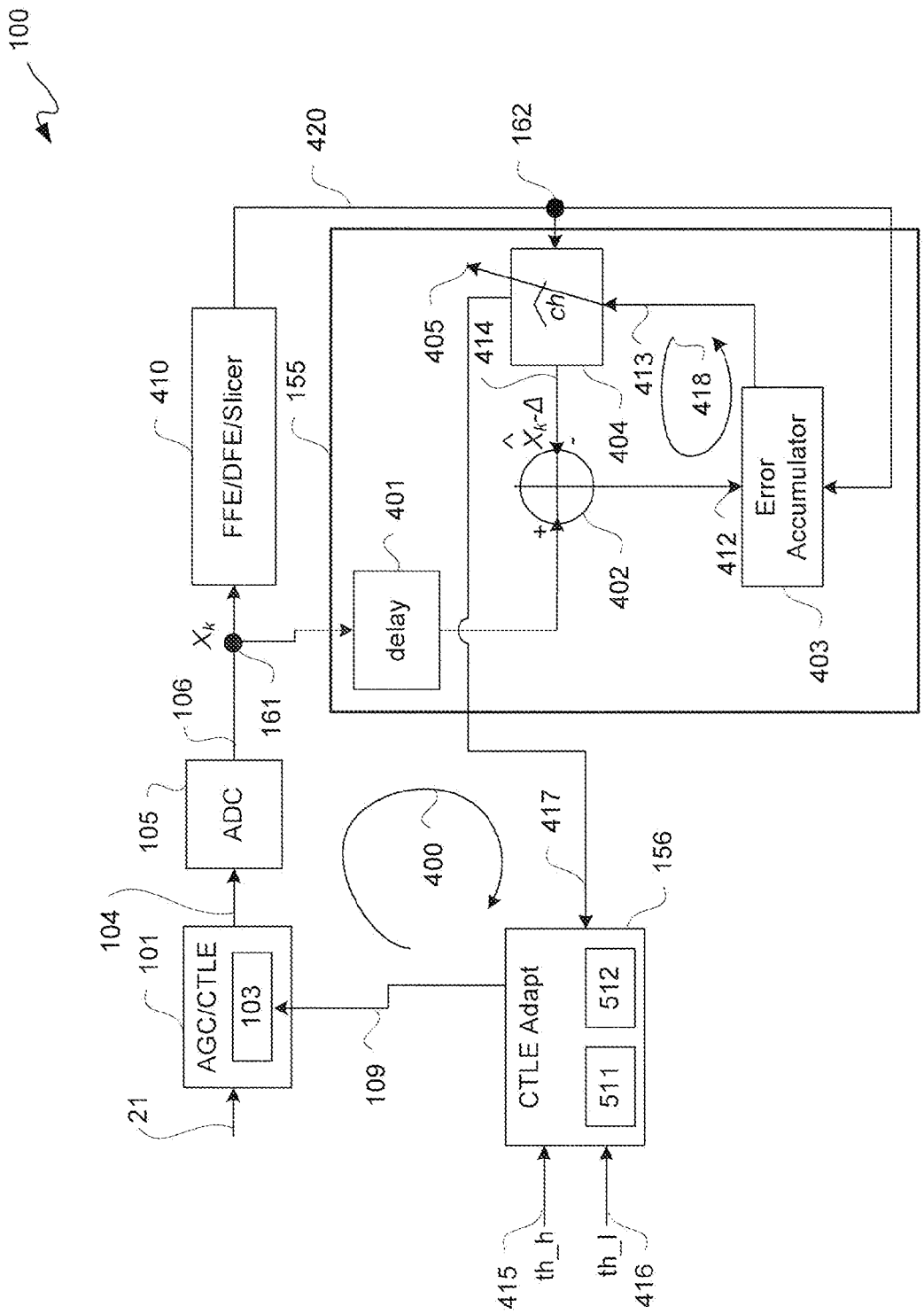
FIG. 4 is a block diagram depicting an exemplary continuous time linear equalization ("CTLE") adaptation loop for a receiver adaptation block of the channel adaptive receiver of FIG. 1.

FIG. 4 is a block diagram depicting an exemplary CTLE adaptation loop 400 for receiver adaptation block 150 of receiver 100. Again, this implementation assumes a PAM4 modulation, for output of possible or probability-based decisions 420 from slicer 123 of FIG. 1 being a value selected from [−3, −1, 1, 3]*h0, namely idealized values or signal levels for possible decisions for PAM4 modulation, where h0 is a slicer level. However, in another implementation, possible states of decisions 420 output may be different than in this example. Other types of modulation that may be used include forms of quadrature amplitude modulation ("QAM"), frequency-shift keying ("FSK") or phase-shift keying ("PSK") modulation. For binary PSK ("BPSK") modulation, idealized values for possible outcomes are [−1, 1].

As previously described, modulated signal 21 is processed through first signal processing block 101, including CTLE block 103, for providing analog signal 104 to ADC 105. ADC 105 outputs digital samples 106 for such analog signal 104 input. Digital samples 106 are generally processed through an FFE 112, a DFE 113, and a slicer 123, as previously described, and generally indicated as FFE/DFE/slicer block 410 for purpose of clarity. First signal processing block 101, ADC 105 and FFE/DFE/slicer block 410 may be of a feedforward path portion of CTLE adaptation loop 400. A feedback path portion of CTLE adaptation loop 400 includes channel estimation block 155 and CTLE adaptation block 156 for CTLE adaptation to communications channel 20.

Channel estimation block includes a delay 401, a subtractor 402, an error accumulator 403, and an estimated channel block 404. In this example, delay 401 is a fixed delay coupled to node 161 for receiving digital samples 106, $x_k$, output from ADC 105. Estimated channel block 404 is coupled to node 162 to receive slicer 123 output decisions 420, namely decisions output from FFE/DFE/slicer block 410, after passing through delay 126, to generate estimated ADC digital samples 414 corresponding to digital samples 106 from ADC 105 output from delay 401. Effectively, estimated ADC digital samples 414 is an estimated channel output.

Digital samples 106 from ADC 105 output from delay 401 are provided to a plus port of subtractor 402, and digital estimated ADC samples 414 generated by estimated channel block 404 are provided to a minus port of subtractor 402. Differences between actual ADC samples 106 and estimated ADC samples 414 output from subtractor 402 are errors 412. Errors 412 may be provided to an error accumulator 403, and error accumulator 403 may provide an accumulated error 413 as a feedback input of error adjustment loop 418 to estimated channel block 404.

Estimated channel block 404 may include an N-tap filter, which in this example is a 5-tap digital finite impulse response filter; however, in other implementations, fewer or more taps than five may be used for such filters. Generally, a digital finite impulse response filter of estimated channel block 404 convolves with output decisions 420 to provide idealized estimated ADC digital samples 414 for ADC 105, which may be compared with actual ADC digital samples 106 corresponding thereto by subtractor 402.

Such estimated channel block 404 may be adjustable, as generally indicated by arrow 405, responsive to accumulated error 413. Along those lines, estimated channel block 404 may be configured for least mean squaring ("LMS") for adjustment to accumulated error 413 for channel adaptation. In this example, LMS adaptation is used to obtain an estimation of channel coefficients or estimated channel coefficients 417 for an equivalent channel, namely an equivalent representation of communications channel 20 ("equivalent channel"), which is a combination of transmitter 10, communication channel 20, AGC 102, CTLE 103 and the ADC 105. However, other types of adaptation implementations may be used in other examples.

Channel estimation block 155 provides an estimation of channel coefficients 417 to CTLE adaptation block 156, which effectively is an estimated channel impulse response for an equivalent channel. CTLE adaptation block 156 may be configured to obtain a channel frequency response for such an equivalent channel corresponding to an estimation of channel coefficients 417 received. From such a channel frequency response, it may be determined whether a high-frequency boost is to be used for CTLE. CTLE adaptation block 156 controls high-frequency boost of CTLE block 103, where CTLE block 103 uses a high-frequency boost for purposes of equalization. Along those lines, ADCs conventionally have noise and some high-frequency errors. Error accumulator 403 may include a digital low pass filter to filter out high-frequency noise and errors.

With additional reference to FIGS. 5A through 5D, CTLE adaptation block 156 is further described based on estimated channel block 404 having five taps $[f_0, f_1, f_2, f_3, f_5]$. Along those lines, a DC response 501 and a Nyquist response 502 may each be determined as indicated in FIGS. 5A and 5B, respectively, and such responses 501 and 502 may be provided to CTLE adaptation block 156 to determine whether a high frequency boost of CTLE block 103 is properly set.

CTLE adaptation block 156 may be coupled to receive a high threshold value via high threshold ("th_h") signal 415 and a low threshold value via low threshold ("th_l") signal 416. Such high and low threshold values may be programmable in CTLE adaptation block 156. CTLE adaptation block 156 may be configured to generate a high frequency threshold ("f_h") by multiplying a DC response 501 by such high threshold value provided via high threshold signal 415. Likewise, CTLE adaptation block 156 may be configured to generate a low frequency threshold ("f_l") by multiplying a DC response 501 by such low threshold value provided via low threshold signal 416.

Generally, CTLE adaptation loop 400 may be operated independently with respect to a FFE/DFE adaptation, which may be useful in reducing loop interaction. Along those lines, FFE/DFE/slicer block 410 only provides an idealized decision value, and so these discrete values are sufficiently unentangled with respect to FFE/DFE adaptation for independent operation of CTLE adaptation loop 400 with respect to FFE/DFE adaptation.

It should be understood that CTLE adaptation loop 400 with a digital feedback path is used to adjust CTLE block 103, and this feedback is performed without using a Fourier Transform. Rather, CTLE adaptation uses a ratio between DC and Nyquist responses of an estimated channel.

CTLE adaptation block 156 may be configured to determine a CTLE adaptation error 510 with respect to frequency response. There are three possible error states, namely a high error state 502, a medium error state 503, and a low error state 504, in this example. In this example, "$\mu$" is an update gain value 511, which may be programmable for programmable control of bandwidth of CTLE adaptation loop 400. CTLE adaptation block 156 may provide a CTLE feedback signal 109 having a current kh value 513, where kh determines an amount of high frequency boost generated by CTLE block 103. Generally, as a kh value increases, a larger amount of high-frequency boost is used.

Generally, if Nyquist response 502 is less than a low frequency threshold ("f_l"), then frequency response in CTLE block 103 is adjusted too low and is to be increased, namely error state 504 is selected. If a high frequency threshold ("f_h") is less than a Nyquist response frequency 502, then frequency response in CTLE block 103 is adjusted too high and is to be decreased, namely error state 502 is selected. If a Nyquist response frequency is between low frequency threshold ("f_l") and high frequency threshold ("f_h") inclusive, then frequency response in CTLE block 103 is correctly adjusted, namely error state 503 is selected so no change in CTLE block 103 is made.

CTLE adaptation block 156 may provide CTLE feedback signal 109 to indicate a current kh value 513 as a control feedback input to CTLE block 103. This CTLE feedback signal 109 is a digital signal, and thus such digital feedback control may be used for analog adjustments by CTLE block 103.

As in Equation 500, a current kh value 513 may be set equal to a previous kh value 512, namely a previous control signal for CTLE, stored in CTLE adaptation block 156, plus a selected error value 510 multiplied by an update gain value, $\mu$, 511, stored in CTLE adaptation block 156. In this example, such an error value 510 may be either +1, 0, or −1, depending where a Nyquist response 502 is with respect to high and low threshold frequencies, as previously described. In short, CTLE adaptation block 156 may be configured to output a current version of a feedback control signal 109, namely a value 513, as equal to a previous version of such feedback control signal 109, namely value 512, plus an error 510 multiplied by an update gain value 511, as previously described.

Figure 6:
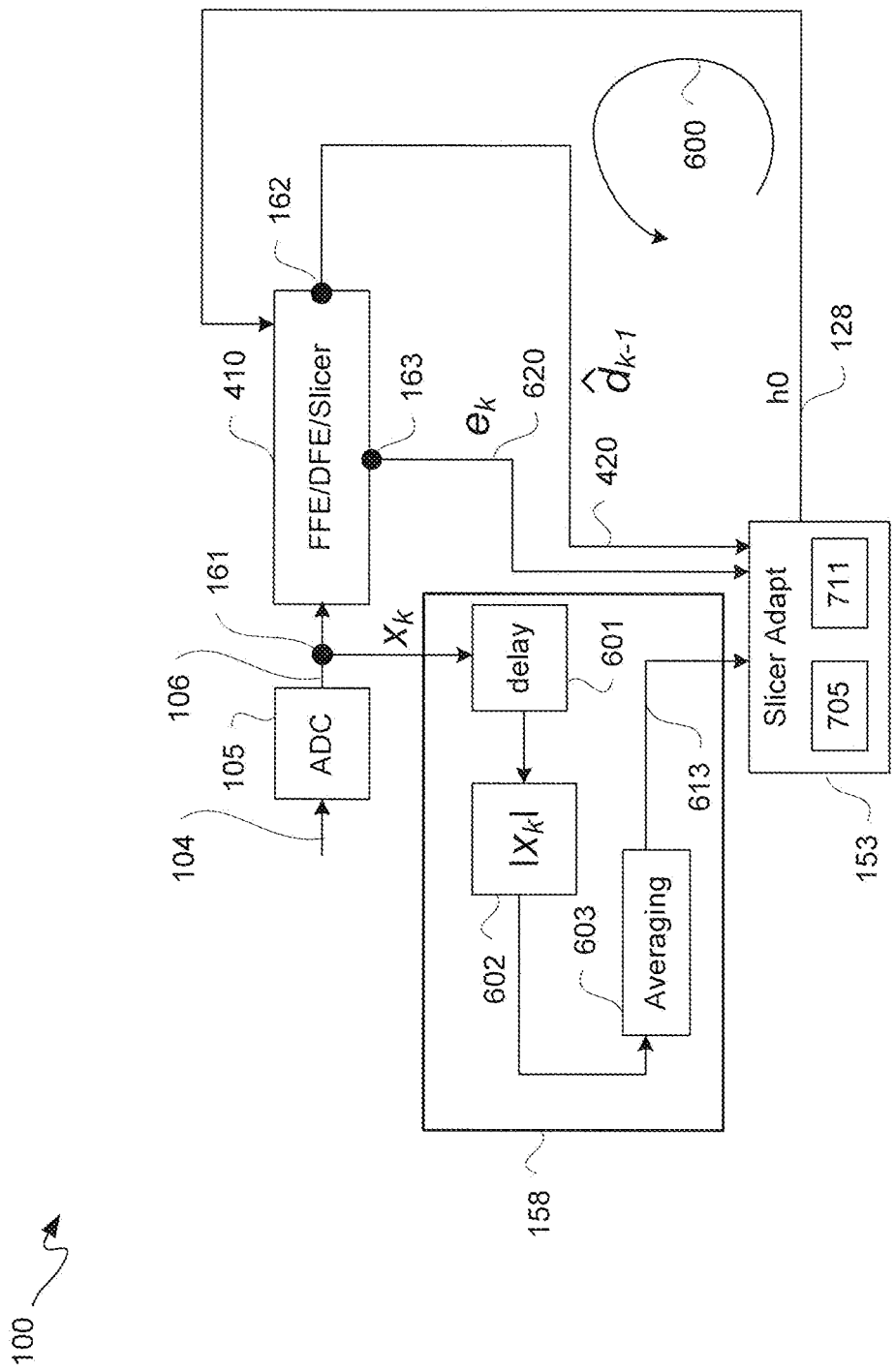
FIG. 6 is a block diagram depicting an exemplary slicer adaptation loop for the receiver adaptation block of the channel adaptive receiver of FIG. 1.

FIG. 6 is a block diagram depicting an exemplary slicer adaptation loop 600 for receiver adaptation block 150 of receiver 100. Again, this implementation assumes a PAM4 modulation, for output of possible decisions 420 from slicer 123 of FIG. 1 being a value selected from [−3, −1, 1, 3]*h0, namely idealized values or signal levels for possible decisions for PAM4 modulation. However, in another implementation, possible states of decisions 420 output may be different than in this example. Other types of modulation that may be used include forms of QAM, FSK or PSK modulation, as previously described. Operation of slicer block 123 may generally be mathematically described as follows. Let $Y_k$ be a $k^{th}$ equalized sample at node 116 of FIG. 1. Then a corresponding slicer output $d_k$ may be given by the equation below.

$$\hat{d}_k = \begin{cases} 3*h_0, & Y_k > 2*h_0 \\ 1*h_0, & 0 < Y_k \le 2*h_0 \\ -1*h_0, & -2*h_0 < Y_k \le 0 \\ -3*h_0, & Y_k \le -2*h_0 \end{cases}$$

As previously described, modulated signal 21 is processed through first signal processing block 101 for providing analog signal 104 to ADC 105. ADC 105 outputs digital samples 106 for such analog signal 104 input. Digital samples 106 are generally processed through an FFE 112, a DFE 113, and a slicer 123, as previously described and generally indicated as FFE/DFE/slicer block 410 for purpose of clarity. FFE/DFE/slicer block 410 may be of a feedforward path portion of slicer adaptation loop 600. A feedback path portion of slicer adaptation loop 600 may include ADC ABS mean determination block 158 and slicer adaptation block 153 for CTLE adaptation to communications channel 20.

In this example implementation, ADC ABS mean determination block 158 includes a delay 601, an absolute value block 602, and a mean or averaging block 603. In this example, delay 601 is a fixed delay coupled to node 161 for receiving digital samples 106, $x_k$, output from ADC 105. Slicer adaptation block 153 is coupled to node 162 to receive slicer 123 output decisions 420, namely decisions output from FFE/DFE/slicer block 410, after passing through delay 126, where $\hat{d}_k$ is the decision of a $k^{th}$ symbol and $\hat{d}_{k-1}$ the decision of a $(k-1)^{th}$ symbol.

Slicer adaptation block 153 may be coupled to node 163 to receive errors $e_k$ from node 163 output by subtractor 124 of second signal processing block 111 of FFE/DFE/slicer block 410. Each error $e_k$ is a difference between an equalized sample at node 116 and an ideal symbol output at slicer 123.

With additional reference to FIGS. 7A and 7B, slicer adaptation loop 600 is further described. Digital samples 106 from ADC 105 output from delay 601 are provided to absolute value block 602 to output absolute values for each of digital samples 106 from ADC 105. These absolute values output by absolute value block 602 may be provided to averaging block 603 to obtain a mean value, x_mean, for such digital samples 106. A mean value signal 613 may be used to provide a mean value, x_mean, to slicer adaptation block 153. Slicer adaptation block 153 may be configured to an updated or adjusted slicer level h0 ("updated h0") 128 as a feedback input to slicer 123. Slicer adaptation block 153 may be configured in accordance with equations of FIGS. 7A and 7B to provide updated h0 128. In accordance with Equation 700, an intermediate updated h0 130 is set to equal the immediately previous h0 701 plus a result of a multiplication of a value µ 711 multiplied by a $k^{th}$ decision 420 $\hat{d}_k$ and multiplied by a sign of error 620. In this example, "µ" is an update gain value 711, which may be programmable for programmable control of bandwidth of slicer adaptation loop 600, and which may be stored in slicer adaptation block 153. Additionally, after determining an intermediate updated h0, namely an intermediate updated slicer level input, 130, an updated slicer level h0 128 may be determined using such intermediate updated slicer level h0 130.

An updated slicer level h0 128 used by slicer block 123 may be obtained by processing an intermediate updated slicer level h0 130 from Equation 700, using Equations 702, 703 and 704. If an updated slicer level h0 130 from Equation 700 is greater than an upper limit 713 which is equal to an x_mean value divided by two plus $\Delta_h$, which may be a programmable value, as in Equation 702, then an updated slicer level 128 is set equal to such upper limit. If an updated slicer level h0 130 from Equation 700 is less than a lower limit 712 which is equal to x_mean value divided by two minus $\Delta_l$, which may be a programmable value, as in Equation 704, then an updated slicer level h0 128 is set equal to such lower limit. If neither of the inequalities of Equations 702 and 704 is true, nothing is done with respect to updated slicer level 130 from Equation 700. After processing in accordance with Equation 702, 703 and 704, an updated slicer level h0 128 may be used by slicer block 123.

Along the above lines, Equations 702 and 704 may be based in part that x_mean is equal to two multiplied by a current slicer level h0 if there is no ISI in digital samples 106 output from ADC 105. As this is an x_mean bound on h0 adaptation by slicer adaptation loop 600, a value for h0 may be generally determined by an ADC absolute value mean rather than with DFE errors, which may be used to reduce interaction between such h0 adaptation and FFE/DFE adaptation. Accordingly, generally slicer adaptation block 153 may be configured for processing an intermediate updated slicer level 130 relative to a lower limit 712 and an upper limit 713 determined mainly from a mean of absolute values of digital samples 106 for providing an updated slicer level 128.

Figure 8:
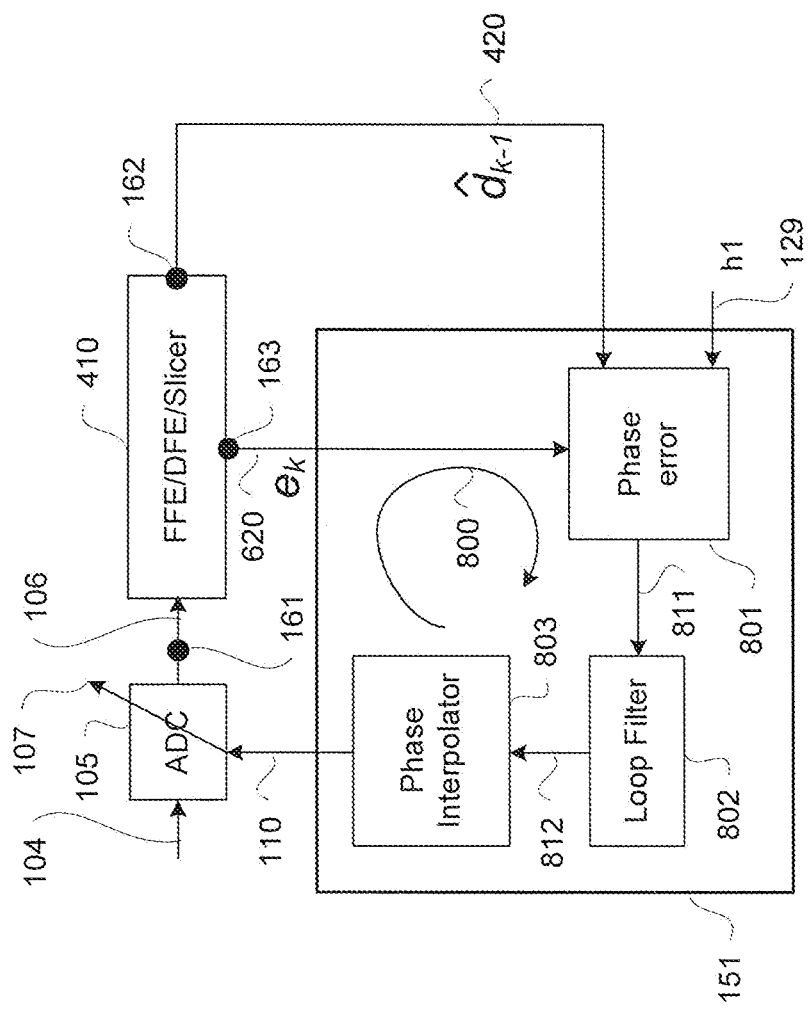
FIG. 8 is a block diagram depicting an exemplary baud rate timing recovery loop for the receiver adaptation block of the channel adaptive receiver of FIG. 1.

FIG. 8 is a block diagram depicting an exemplary baud rate timing recovery loop 800 for receiver adaptation block 150 of receiver 100. Again, this implementation assumes a PAM4 modulation, for output of possible decisions 420 from slicer 123 of FIG. 1 being a value selected from [−3, −1, 1, 3]*h0, namely idealized values or signal levels for possible decisions for PAM4 modulation. However, in another implementation, possible states of decisions 420 output may be different than in this example. Other types of modulation that may be used include forms of QAM, FSK or PSK modulation, as previously described.

As previously described, modulated signal 21 is processed through first signal processing block 101 for providing analog signal 104 to ADC 105. ADC 105 outputs digital samples 106 for such analog signal 104 input. Digital samples 106 are generally processed through an FFE 112, a DFE 113, and a slicer 123, as previously described and generally indicated as FFE/DFE/slicer block 410 for purpose of clarity. ADC 105 and FFE/DFE/slicer block 410 may be of a feedforward path portion of baud rate timing recovery loop 800.

A feedback path portion of baud rate timing recovery loop 800 may include MMSE CDR block 151 for baud rate timing recovery for a communications channel 20. Generally, MMSE CDR block 151 is configured to minimize mean squared error $E[e_k^2]$, where $e_k$, 620, is a difference between an equalized sample at node 116 and a decision from slicer block 123, namely output node 163.

MMSE CDR block 151 may include a phase error block 801, a loop filter 802, and a phase interpolator 803. Phase error block 801 may be coupled for receiving coefficient h1 129 and may be respectively coupled to output nodes 162 and 163 of second signal processing block 111 of FFE/DFE/slicer block 410. From output node 162, phase error block 801 may receive slicer 123 output decisions 420, namely decisions output from FFE/DFE/slicer block 410, after passing through delay 126. From output node 163, phase error block 801 may receive differences, or errors, output by subtractor 124, namely differences between re-equalized samples 116 and corresponding decisions 420 output from slicer 123 prior to output from delay 126, which differences are equalization errors, $e_k$, 620 for corresponding $k^{th}$ equalized samples.

With additional reference to FIGS. 9A and 9B, baud rate timing recovery loop 800 is further described. Phase error may be determined in accordance with Equations 900 and 910. Accordingly, phase error block 801 may be configured in accordance with Equations 900 and 910 to provide a phase error via phase error signal 811, where $te_k$ is a timing error gradient and $y_k$ is an estimated ideal signal at FFE 112 output, namely equalized samples 114. Accordingly, in Equation 900, k is an index of equalized samples 114, where "te" is for timing error (i.e., $te_{k-1}$ is a variable corresponding to a phase error for a (k−1)th sample; $e_{k-1}$ is an equalization error at time k−1; and $y_k$ and $y_{k-2}$ are estimated ideal signal samples at time k and time k−2, respectively, of corresponding equalized samples 114 output at FFE 112.

Loop filter 802 may be coupled to receive a phase error from phase error block 801 via such phase error signal 811. Loop filter 802, which in this example is a digital low pass filter, may be used to filter out high frequency noise and errors in such phase error to provide a low pass filtered phase error via filtered phase error signal 812 to phase interpolator 803. Phase interpolator 803, which may include a digital-to-analog converter ("DAC"), a voltage controlled oscillator ("VCO"), and other known components thereof, may be configured to adjust sampling phase of ADC 105 in response to such low pass filtered phase error output from loop filter 802. Along those lines, phase interpolator 803 may output sampling phase adjustment signal 110 for a feedback input to ADC 105 for adjusting sampling phase thereof, as generally indicated by arrow 107.

Figure 10:
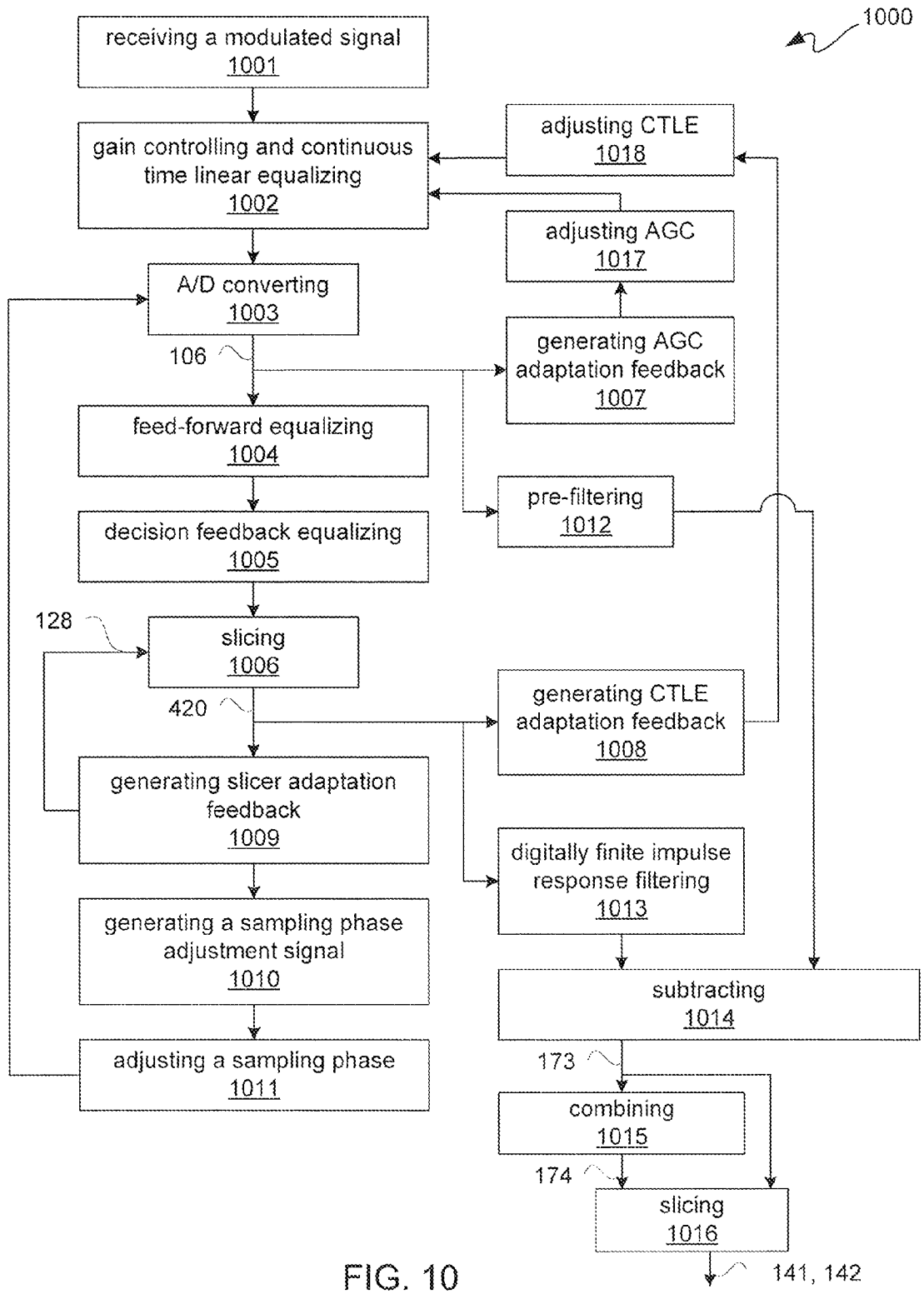
FIG. 10 is a flow diagram depicting an adaptive receiving process for the channel adaptive receiver of FIG. 1.

FIG. 10 is a flow diagram depicting an adaptive receiving process 1000 for receiver 100 of FIG. 1. Accordingly, adaptive receiving process 1000 is described further with simultaneous reference to FIGS. 1 through 10.

At 1001, a modulated signal 21 from a communications channel 20 may be received. At 1002, gain controlling and continuous time linear equalizing of modulated signal 21 may be performed with an AGC block 102 and a CTLE block 103, respectively, for providing an analog signal 104.

At 1003, analog signal 104 may be converted to digital samples 106 with an ADC 105. At 1004, feed-forward equalizing of digital samples 106 may be performed with an FFE block 112 to provide equalized samples 114. At 1005, decision feedback equalizing of equalized samples 114 may be performed with a DFE block 113 to provide re-equalized samples 116. At 1006, re-equalized samples 116 may be sliced with a slicer 123 to provide decisions 420 corresponding to a modulation type of modulated signal 21.

With digital samples 106 available, at 1007, AGC adaptation feedback may be generated with an AGC adaptation block 157, as previously described for generation of feedback signal 108, feeding back to operation 1002 for adjusting AGC block 102 to communications channel 20. Accordingly, at 1017, AGC block 102 may be adjusted responsive to such feedback for continuing operation at 1002.

With decisions 420 available, at 1008, CTLE adaptation feedback may be generated with a channel estimation block 155 and a CTLE adaptation block 156, as previously described for generation of feedback signal 109, feeding back to operation 1002 for adjusting CTLE block 103 to communications channel 20. Accordingly, at 1018, CTLE block 103 may be adjusted responsive to such feedback for continuing operation at 1002.

With decisions 420, as well as errors 620 associated therewith, available, at 1009, slicer adaptation feedback may be generated with a mean determination block 158 and a slicer adaptation block 153, as previously described for generation of h0 coefficient 128, feeding back to operation 1006 for adjusting an h0 coefficient or slicer level input to slicer 123 for adjusting to communications channel 20. This generally indicated with feedback of h0 coefficient 128 to operation 1006.

With decisions 420 available, as well as errors 620 associated therewith and an h1 coefficient, at 1010, a sampling phase adjustment signal 110 may be generated by an MMSE CDR block 151, as previously described. At 1011, a sampling phase of ADC 105 may be adjusted responsive to sampling phase adjustment signal 110 for a baud rate timing recovery for adaptation to communications channel 20, as previously described.

Also, with digital samples 106 available, after a delay as previously described, which may be associated with operations 1004 through 1006 of process 1000, at 1012, digital samples 106 may be pre-filtered with a pre-filter 132 to provide a pre-filtered output 171. At 1013, decisions 420 may be digitally finite impulse response filtered with a DFIR filter 133 to provide an estimated residual ISI output 172. At 1014, a subtractor 134 may be used to subtract estimated residual ISI output 172 from pre-filtered output 171 for reducing residual ISI in pre-filtered output 171 for providing an equalized signal 173, which is a digital difference signal. Optionally, at 1015, digital difference signal 173 and re-equalized samples 116 may be diversity combined with a diversity combiner 137 for providing a combined equalized signal. Optionally, combining operation 1015 may be bypassed to go directly to slicing of equalized signal 173 from output of subtracting operation 1014. At 1016, either equalized signal 173 or combined equalized signal 174 may be sliced by a data slicer, such as data slicer 136 or 139 for example, for providing data output 141 or 142. Such data output 141 and 142 is serial data, and such serial data may be converted to parallel data downstream, though not shown for purposes of clarity and not limitation.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs" or "DRAMS"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 11:
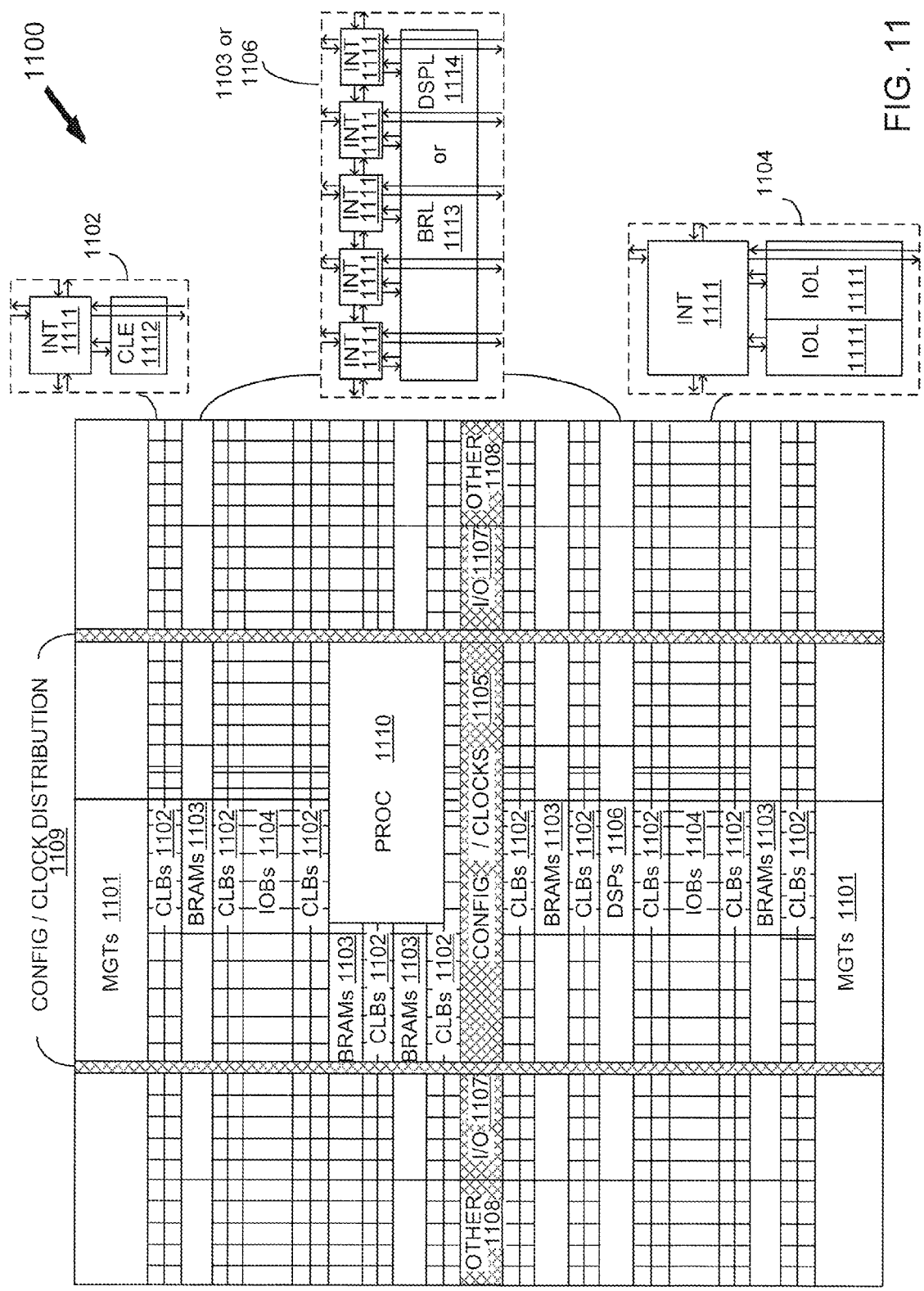
FIG. 11 is a simplified block diagram depicting an exemplary columnar Field Programmable Gate Array ("FPGA") architecture.

As noted above, advanced FPGAs can include several different types of programmable logic blocks in the array. For example, FIG. 11 illustrates an FPGA architecture 1100 that includes a large number of different programmable tiles including multi-gigabit transceivers ("MGTs") 1101, configurable logic blocks ("CLBs") 1102, random access memory blocks ("BRAMs") 1103, input/output blocks ("IOBs") 1104, configuration and clocking logic ("CONFIG/CLOCKS") 1105, digital signal processing blocks ("DSPs") 1106, specialized input/output blocks ("I/O") 1107 (e.g., configuration ports and clock ports), and other programmable logic 1108 such as digital clock managers, analog-to-digital converters, system monitoring logic, and so forth. Some FPGAs also include dedicated processor blocks ("PROC") 1110.

In some FPGAs, each programmable tile includes a programmable interconnect element ("INT") 1111 having standardized connections to and from a corresponding interconnect element in each adjacent tile. Therefore, the programmable interconnect elements taken together implement the programmable interconnect structure for the illustrated FPGA. The programmable interconnect element 1111 also includes the connections to and from the programmable logic element within the same tile, as shown by the examples included at the top of FIG. 11.

For example, a CLB 1102 can include a configurable logic element ("CLE") 1112 that can be programmed to implement user logic plus a single programmable interconnect element ("INT") 1111. A BRAM 1103 can include a BRAM logic element ("BRL") 1113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 1106 can include a DSP logic element ("DSPL") 1114 in addition to an appropriate number of programmable interconnect elements. An IOB 1104 can include, for example, two instances of an input/output logic element ("IOL") 1115 in addition to one instance of the programmable interconnect element 1111. As will be clear to those of skill in the art, the actual I/O pads connected, for example, to the I/O logic element 1115 typically are not confined to the area of the input/output logic element 1115.

In the pictured embodiment, a horizontal area near the center of the die (shown in FIG. 11) is used for configuration, clock, and other control logic. Vertical columns 1109 extending from this horizontal area or column are used to distribute the clocks and configuration signals across the breadth of the FPGA.

Some FPGAs utilizing the architecture illustrated in FIG. 11 include additional logic blocks that disrupt the regular columnar structure making up a large part of the FPGA. The additional logic blocks can be programmable blocks and/or dedicated logic. For example, processor block 1110 spans several columns of CLBs and BRAMs.

Note that FIG. 11 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 11 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A receiver, comprising:
   a first signal processing block coupled to a communications channel, comprising:
      an automatic gain control ("AGC") block and a continuous time linear equalization ("CTLE") block for receiving a modulated signal for providing an analog signal;
      an analog-to-digital converter ("ADC") for converting the analog signal to digital samples; and
      a feed-forward equalization ("FFE") block for equalizing the digital samples to provide equalized samples;
   a second signal processing block, comprising:
      a decision feedback equalization ("DFE") block for receiving the equalized samples for providing re-equalized samples; and
      a slicer coupled to the DFE block for slicing the re-equalized samples for providing decisions; and
   a receiver adaptation block coupled to the first signal processing block and the second signal processing block, the receiver adaptation block configured for providing an AGC adaptation, a CTLE adaptation, and a slicer adaptation to the communications channel, the CTLE adaptation being responsive in part to the decisions, wherein the receiver adaptation block includes a feedback path of an AGC adaptation loop including an AGC adaptation block for the AGC adaptation to the communications channel, and wherein the AGC adaptation block comprises a first counter, a second counter, and an AGC adaptation module, and wherein:

the first counter is coupled to receive a clock signal and a window length signal to provide a reset signal;

the second counter is coupled to receive the digital samples and the reset signal to provide a count signal; and the AGC adaptation module is coupled to receive the count signal, a first saturation threshold signal, and a second saturation threshold signal to provide a feedback signal to the AGC block.

2. The receiver according to claim 1, wherein:
the modulated signal is a pulse amplitude modulated signal; and
the communications channel is a backplane channel.

3. The receiver according to claim 1, wherein:
the first counter is configured to have a window length set responsive to the window length signal and to assert the reset signal responsive to a number of pulses of the clock signal corresponding to the window length; and
the second counter is configured to count a number of ADC saturation states in the digital samples received during the window length to provide the count via the count signal to the AGC adaptation module.

4. The receiver according to claim 3, wherein:
the AGC adaptation module is configured to output the feedback signal as a current gain;
the current gain is equal to a previous gain plus an error multiplied by an update gain value; and
the error is selected using the count relative to a high threshold value and a low threshold value provided via the first saturation threshold signal and the second saturation threshold signal, respectively.

5. The receiver according to claim 1, wherein the receiver adaptation block includes a feedback path of a CTLE adaptation loop including a CTLE adaptation block and a channel estimation block for the CTLE adaptation to the communications channel.

6. The receiver according to claim 1, wherein the receiver adaptation block includes a feedback path of a slicer adaptation loop including a slicer adaptation block and a mean determination block for the slicer adaptation to the communications channel.

7. The receiver according to claim 6, wherein:
the slicer is for receiving the re-equalized samples for providing the decisions;
the mean determination block is for receiving the digital samples for providing a mean therefor; and
the slicer adaptation block is coupled to the slicer and the DFE block to receive an error associated with the digital samples and coupled to the slicer to receive the decisions to provide an updated slicer level to the slicer.

8. The receiver according to claim 1, wherein the receiver adaptation block includes a feedback path of a baud rate timing recovery loop including a minimum mean square error ("MMSE") clock data recovery ("CDR") block for a feedback input to the ADC for adjusting sampling phase of the ADC for adaptation to the communications channel.

9. The receiver according to claim 8, wherein:
the slicer is for receiving the re-equalized samples for providing the decisions;

the MMSE CDR block is coupled to the slicer for receiving the decisions and coupled to the slicer and the DFE block for receiving an error associated with the digital samples;

the MMSE CDR block is further for receiving an h1 coefficient; and the MMSE CDR block is configured for providing the feedback input.

10. The receiver according to claim 9, wherein:
the MMSE CDR block is configured to provide a phase error for the feedback input according to:

$$te_{k-1}=e_{k-1}(y_k-y_{k-2}),$$

where k is an index of the equalized samples, $te_{k-1}$ is a phase error for a (k−1)th sample, $e_{k-1}$ is an equalization error at time k−1, and $y_k$ and $y_{k-2}$ are estimated ideal signal samples at time k and time k−2, respectively, for the equalized samples corresponding thereto output by the FFE block; and
the MMSE CDR block is configured to provide $y_k$ according to:

$$y_k=\hat{d}_k+h_1\cdot\hat{d}_{k-1}$$

Where $\hat{d}_k$ is the decision of a $k^{th}$ symbol and $\hat{d}_{k-1}$ is the decision of a $(k-1)^{th}$ symbol.

11. A receiver, comprising:
a first signal processing block coupled to a communications channel, comprising:
an automatic gain control ("AGC") block and a continuous time linear equalization ("CTLE") block for receiving a modulated signal for providing an analog signal;
an analog-to-digital converter ("ADC") for converting the analog signal to digital samples; and
a feed-forward equalization ("FFE") block for equalizing the digital samples to provide equalized samples;
a second signal processing block, comprising:
a decision feedback equalization ("DFE") block for receiving the equalized samples for providing re-equalized samples; and
a slicer coupled to the DFE block for slicing the re-equalized samples for providing decisions; and
a receiver adaptation block coupled to the first signal processing block and the second signal processing block, the receiver adaptation block configured for providing an AGC adaptation, a CTLE adaptation, and a slicer adaptation to the communications channel, the CTLE adaptation being responsive in part to the decisions, wherein the receiver adaptation block includes a feedback path of a CTLE adaptation loop including a CTLE adaptation block and a channel estimation block for the CTLE adaptation to the communications channel, and wherein the channel estimation block is for receiving the digital samples and the decisions for providing estimated channel coefficients for an equivalent channel for the communications channel; and the CTLE adaptation block is for receiving the estimated channel coefficients, a first threshold signal, and a second threshold signal to provide a feedback signal to the CTLE block.

12. The receiver according to claim 11, wherein:
the CTLE adaptation block is configured to output the feedback signal to control amount of high-frequency boosting by the CTLE block;
the CTLE adaptation block is configured to output a current version of the feedback signal as equal to a previous version of the feedback signal plus an error multiplied by an update gain value; and the error is selected using a Nyquist response relative to a high threshold value and a low threshold value provided via the first threshold signal and the second threshold signal, respectively.

13. A receiver, comprising:

a first signal processing block coupled to a communications channel, comprising:
- an automatic gain control ("AGC") block and a continuous time linear equalization ("CTLE") block for receiving a modulated signal for providing an analog signal;
- an analog-to-digital converter ("ADC") for converting the analog signal to digital samples; and
- a feed-forward equalization ("FFE") block for equalizing the digital samples to provide equalized samples;

a second signal processing block, comprising:
- a decision feedback equalization ("DFE") block for receiving the equalized samples for providing re-equalized samples; and
- a slicer coupled to the DFE block for slicing the re-equalized samples for providing decisions; and a receiver adaptation block coupled to the first signal processing block and the second signal processing block, the receiver adaptation block configured for providing an AGC adaptation, a CTLE adaptation, and a slicer adaptation to the communications channel, the CTLE adaptation being responsive in part to the decisions,
- wherein the receiver adaptation block includes a feedback path of a slicer adaptation loop including a slicer adaptation block and a mean determination block for the slicer adaptation to the communications channel, wherein:
  - the slicer is for receiving the re-equalized samples for providing the decisions;
  - the mean determination block is for receiving the digital samples for providing a mean therefor; and
  - the slicer adaptation block is coupled to the slicer and the DFE block to receive an error associated with the digital samples and coupled to the slicer to receive the decisions to provide an updated slicer level to the slicer, and wherein:
    - the slicer adaptation block is configured to provide an intermediate updated slicer level as being equal to a previous slicer level plus a result from multiplication of sign of the error, an update gain value and the decisions multiplied with one another; and
    - the slicer adaptation block is configured for processing the intermediate updated slicer level relative to a lower limit and an upper limit determined mainly from a mean of absolute values of the digital samples for providing the updated slicer level.

14. A receiver, comprising:

a first signal processing block coupled to a communications channel, comprising:
- an automatic gain control ("AGC") block and a continuous time linear equalization ("CTLE") block for receiving a modulated signal for providing an analog signal;
- an analog-to-digital converter ("ADC") for converting the analog signal to digital samples; and
- a feed-forward equalization ("FFE") block for equalizing the digital samples to provide equalized samples;

a second signal processing block, comprising:
- a decision feedback equalization ("DFE") block for receiving the equalized samples for providing re-equalized samples;
- a slicer coupled to the DFE block for slicing the re-equalized samples for providing decisions; and
- a receiver adaptation block coupled to the first signal processing block and the second signal processing block, the receiver adaptation block configured for providing an AGC adaptation, a CTLE adaptation, and a slicer adaptation to the communications channel, the CTLE adaptation being responsive in part to the decisions;

a digital finite impulse response ("DFIR") filter for receiving decisions for providing an estimated residual intersymbol interference ("ISI");

a pre-filter for partial response equalization and noise shaping of the digital samples for providing a pre-filtered output; and a subtractor for receiving the pre-filtered output and the estimated residual ISI for reducing actual residual ISI in the pre-filtered output for providing an equalized signal.

15. The receiver according to claim 14, wherein the slicer is a first slicer, the receiver further comprising:
- a diversity combiner for receiving the equalized signal and the re-equalized samples for providing a combined equalized signal; and
- a second slicer for receiving the combined equalized signal for providing a data output signal.

* * * * *